Nov. 11, 1958 J. L. F. ROSS 2,859,793
PIVOTALLY MOUNTED LATERALLY SPACED FLUID
PRESSURE MEANS FOR TWISTING CRANKSHAFTS
Filed Feb. 8, 1955 6 Sheets-Sheet 5

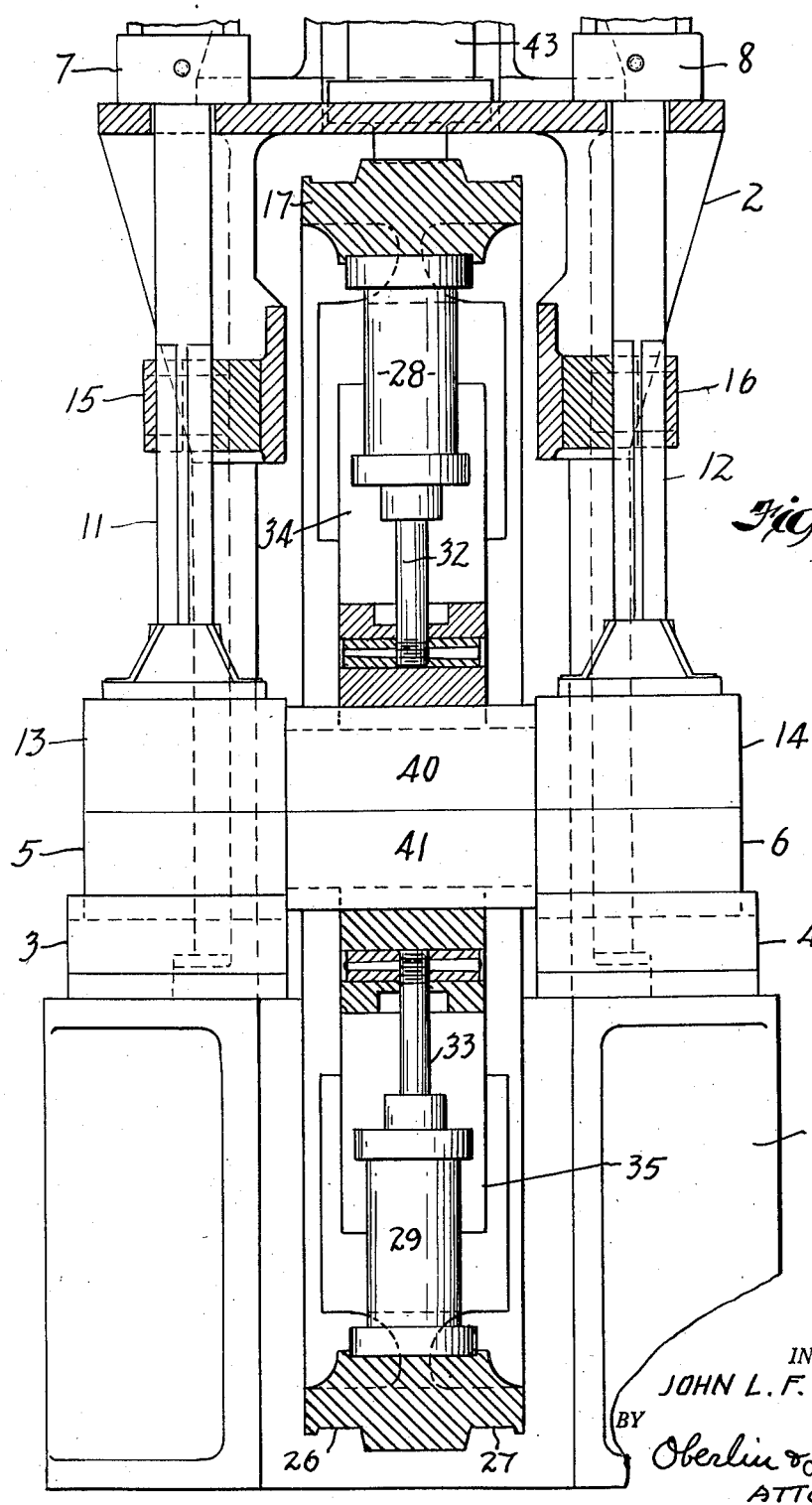

AS FORGED

TWISTED

INVENTOR.
JOHN L. F. ROSS
BY
Oberlin & Limbach
ATTORNEYS.

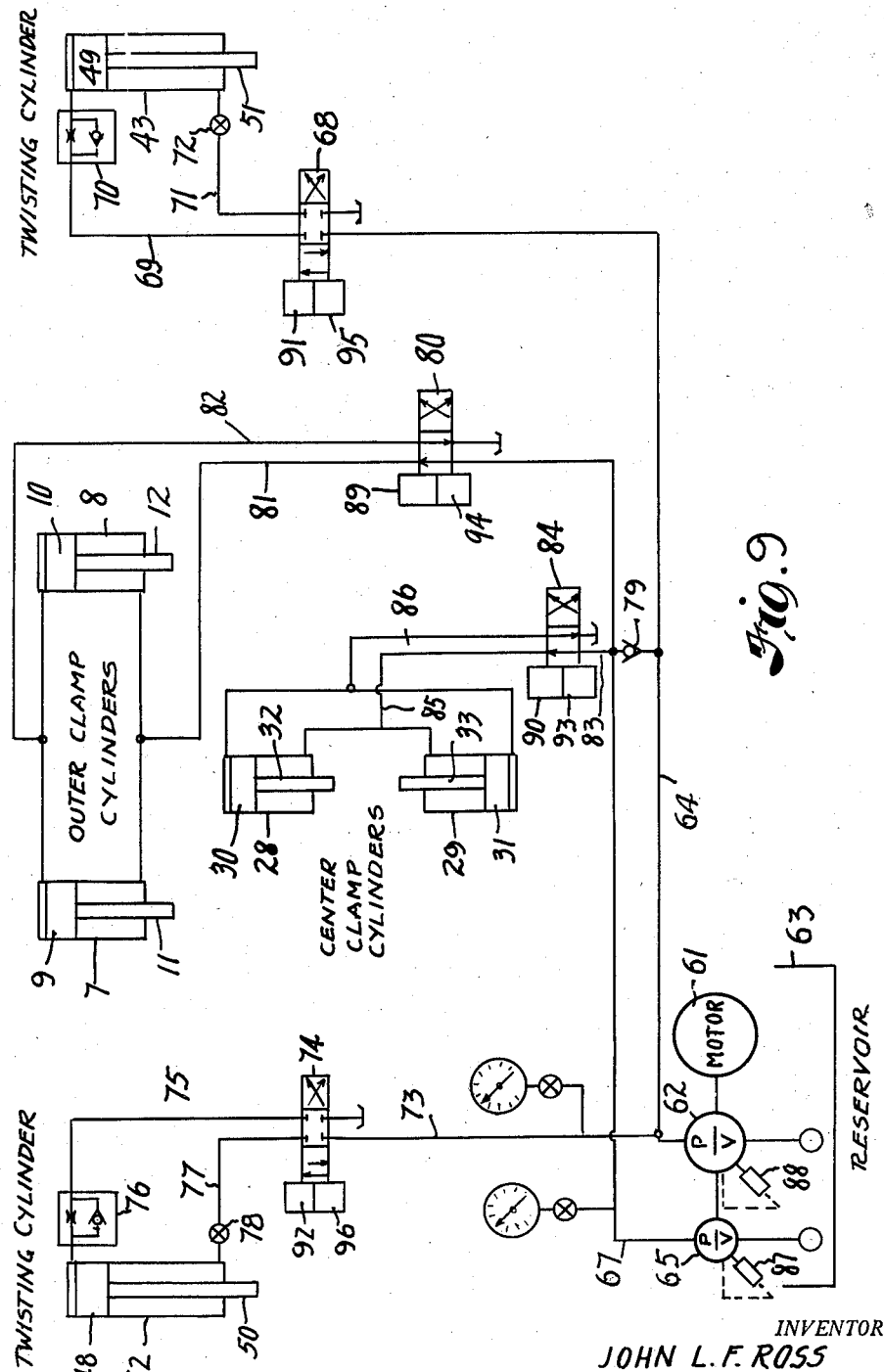

United States Patent Office 2,859,793
Patented Nov. 11, 1958

2,859,793

PIVOTALLY MOUNTED LATERALLY SPACED FLUID PRESSURE MEANS FOR TWISTING CRANKSHAFTS

John L. F. Ross, South Euclid, Ohio, assignor to The Ajax Manufacturing Company, Euclid, Ohio, a corporation of Ohio Application February 8, 1955, Serial No. 486,890

3 Claims. (Cl. 153—78)

This invention relates as indicated to a novel crankshaft twisting machine, and more particularly to a machine designed to subject hot forged crankshafts to a twisting operation in which certain of the throws are moved angularly about the axis of the crankshaft relative to other of the throws.

A number of different machines have been proposed in the past to serve the general purpose indicated, one of the most practical and successful being that illustrated and described in Morgan Patent No. 1,991,567. Two spaced clamps are adapted fixedly to grip the end portions of a red hot forged crankshaft and intermediate such two spaced clamping means is a third clamp mounted centrally of a large rotatable wheel, which latter clamp is adapted to grip the central portion of the crankshaft. While the two end portions of the crankshaft are thus held against rotation, the wheel may be turned through an arc of, for example, 60° by means of gearing and an electric motor, thereby twisting the crankshaft to a corresponding extent.

Due to the very high stresses involved in the twisting operation and the high degree of precision desired, a number of problems arise which have in the past been only partially overcome. The twisting wheel is difficult to maintain exactly centered about the longitudinal axis of the work-piece, and it has also been difficult to regulate the angle of twist to the precise point desired. Hydraulic operating means have also been proposed but have not proven entirely satisfactory in the past.

It is a principal object of my invention to provide a novel crankshaft twisting machine which, while very powerful, will nevertheless be precise and positive in its action.

Another object is to provide a crankshaft twisting machine in which the twisting operation as well as the clamping operations are performed through employment of hydraulic power.

Still another object is to provide such machine which will be of unusual ease and safety of operation.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 4 is a vertical longitudinal section on an enlarged scale taken on the line 4—4 on Fig. 1 but showing the clamping dies and base frame members in side elevation;

Fig. 9 is a fluid pressure diagram for my new machine.

Figure 1:
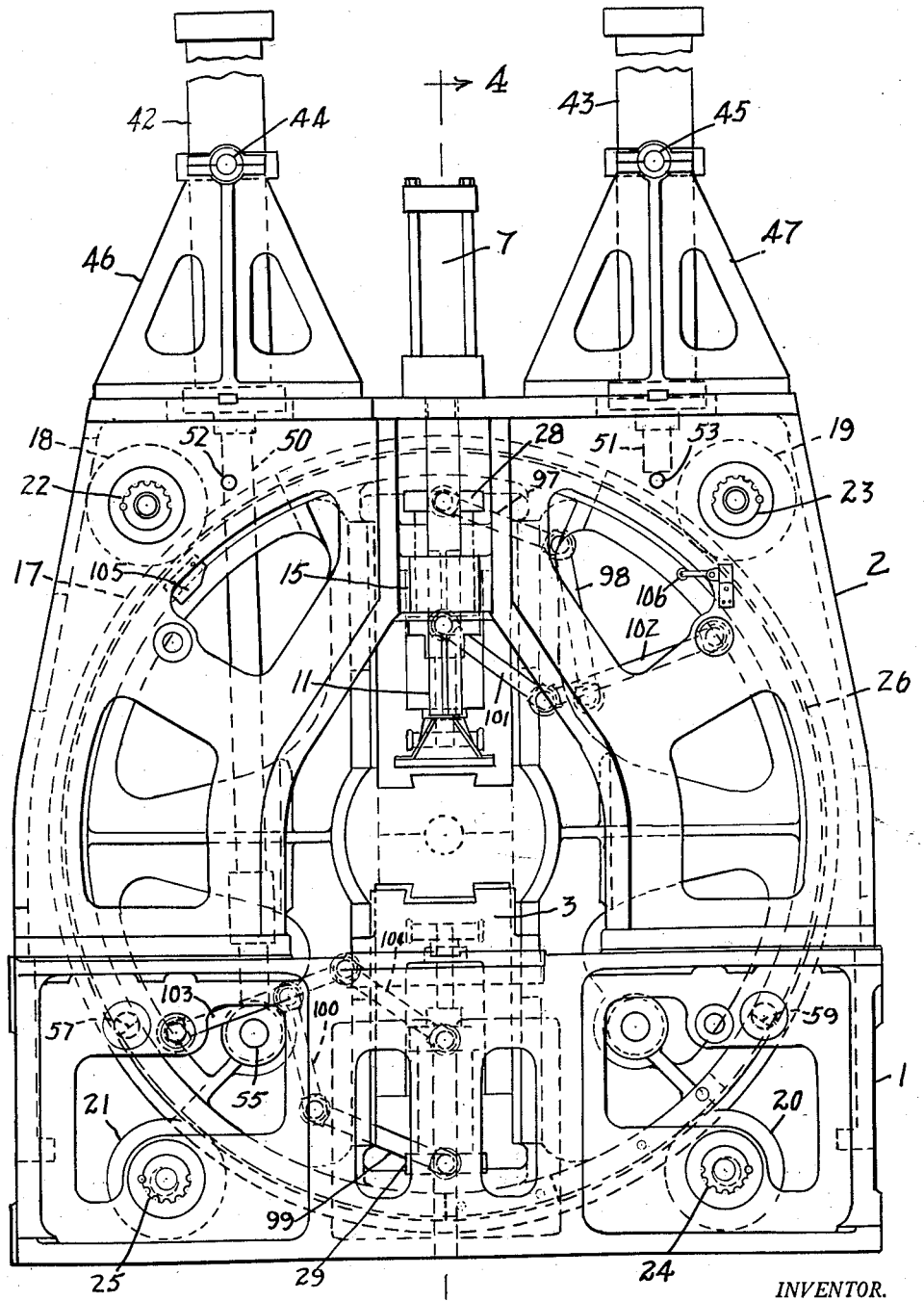
Fig. 1 is an end elevational view of a machine embodying the principles of my invention.
Figure 2:
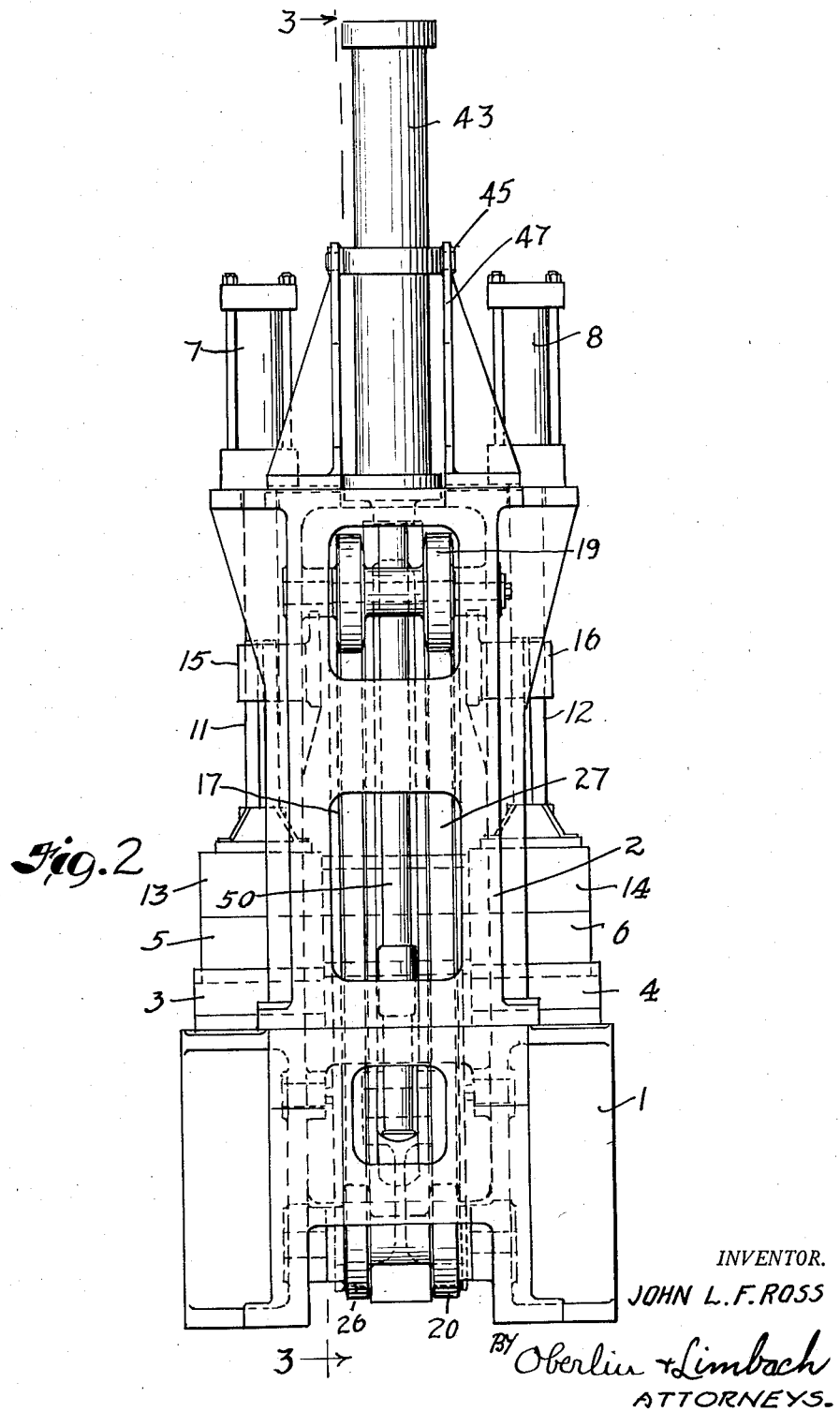
Fig. 2 is a side elevational view of such machine.

Referring now more particularly to the drawing and especially Figs. 1–4 thereof, the embodiment of my invention there illustrated comprises a cast base frame 1 upon which is rigidly mounted an upper frame or housing 2. Also supported on base frame 1 are outer die seats 3 and 4 mounting outer lower crankshaft end clamping dies 5 and 6. A pair of vertically disposed fluid pressure piston-cylinder assemblies are mounted on the top of upper frame 3 comprising cylinders 7 and 8 having pistons 9 and 10 therein with rods 11 and 12 extending downwardly and bearing at their ends clamping dies 13 and 14 directly opposed to the stationary lower end clamping dies 5 and 6 respectively. Such dies 5, 6 and 13, 14 are shaped to correspond to like portions of the forging dies employed in forging the crankshaft which is to be held thereby. By admitting fluid pressure to the upper ends of cylinders 7 and 8, dies 13 and 14 may be brought down into firm clamping relation to hold the respective end portions of a crankshaft firmly against rotation. The rods 11 and 12 are of square cross-section in their lower portions and fit in guides 15 and 16 on frame 2 which accordingly ensure straight-line reciprocation of rods 11 and 12 and also prevent any turning of dies 13 and 14 about the axes of such rods.

A large diameter wheel 17 is mounted for rotation within frame or housing 2 about the longitudinal axis of the work gripped by the outer clamping dies 5, 13 and 6, 14. Such wheel is thus supported by four double rollers 18, 19, 20 and 21 journalled in bearings 22, 23, 24 and 25 in upper frame 2 and base frame 1. Such bearings are provided with eccentric bushings for the roller axle pins adapted to be retained in adjusted rotative position and thereby afford a certain degree of adjustment of the position of such rollers radially of wheel 17. The double rollers engage in peripheral grooves or trackways 26 and 27 in wheel 17 (Figs. 2 and 4) thereby both supporting and centering such wheel and also holding the same against axial displacement.

A pair of fluid pressure piston-cylinder assemblies are mounted in diametrical alignment in such wheel 17 comprising cylinders 28 and 29 having pistons 30 and 31 therein adapted to be reciprocated by admission of fluid pressure to the outer ends of such cylinders to shift rods 32 and 33 directly toward each other. Such rods are engaged with slides 34 and 35 respectively mounted for reciprocation in diametrically aligned guideways 36, 37 and 38, 39, such slides providing seats for center clamping dies 40 and 41. Admission of fluid pressure to the outer ends of cylinders 28 and 29 accordingly serves to reciprocate slides or rams 34 and 35 toward one another to cause dies 40 and 41 firmly to grip the forged crankshaft in the region intermediate end clamping dies 5, 13 and 6, 14.

Figure 3:
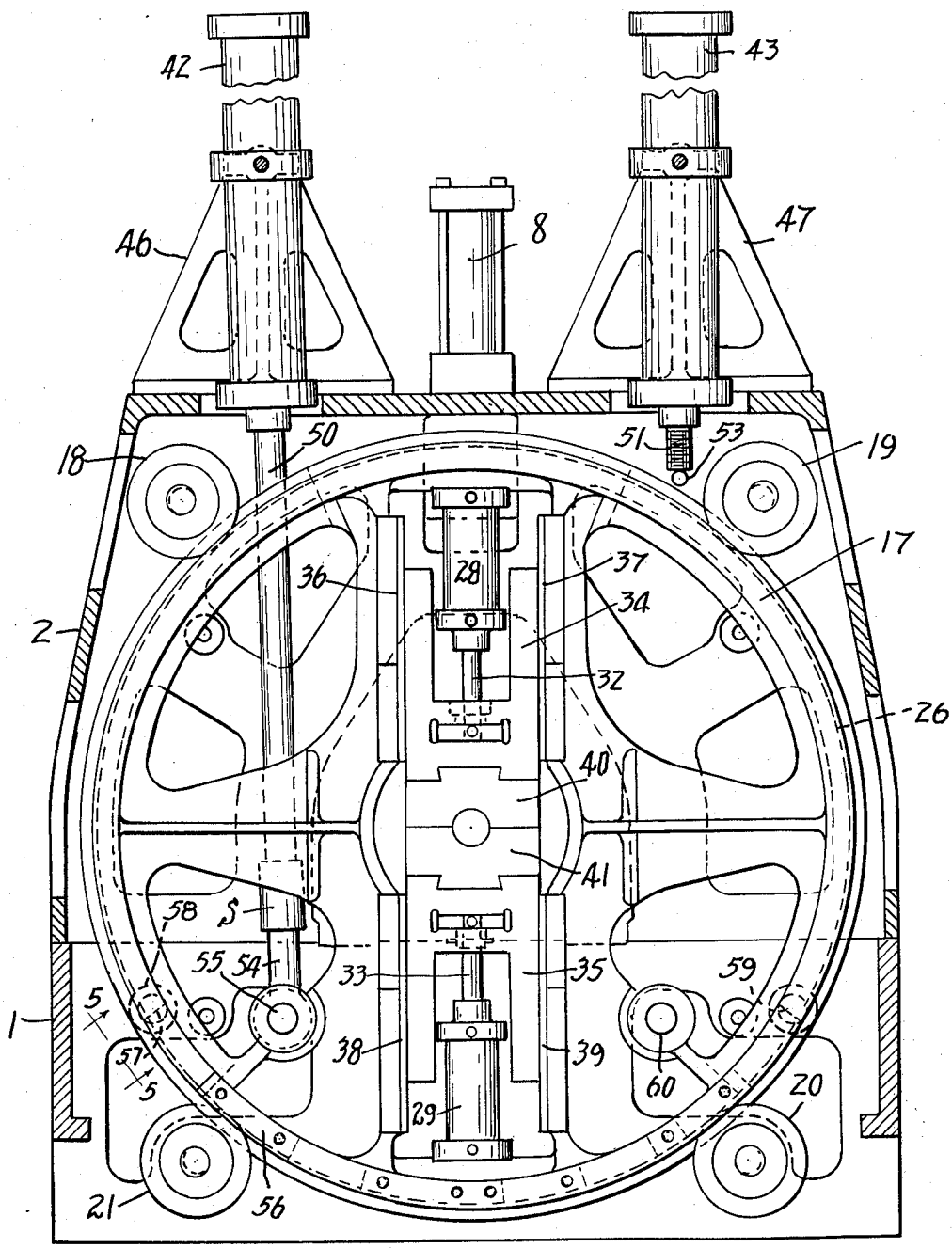
Fig. 3 is a vertical transverse section taken on the line 3—3 on Fig. 2.
Figure 5:
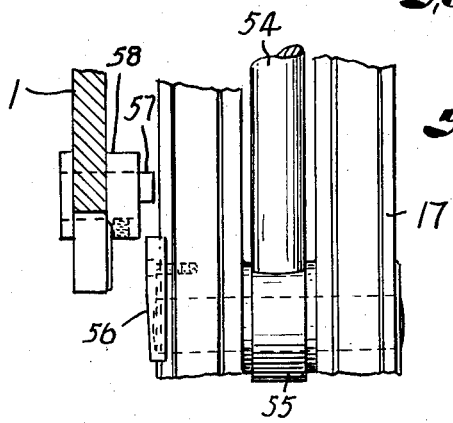
Fig. 5 is a fragmentary detail view on an enlarged scale of the piovtal connection of the hydraulic piston rod to the twisting wheel.

Now referring more particularly to Figs. 3 and 5 of the drawing, means are provided for rotating wheel 17 in either direction as may be desired, such rotation, of course, serving to twist that portion of the work gripped by dies 40 and 41 intermediate the outer clamping dies which hold the respective end portions of the work-piece firmly against rotation. Fluid pressure piston-cylinder assemblies comprising cylinders 42 and 43 are pivotally mounted in trunnions 44 and 45 on upper stands 46 and 47 for swinging movement about axes parallel to the axis of rotation of wheel 17. Such cylinders 42 and 43 are thus located directly above wheel 17 but respectively spaced a substantial distance to either side of the axis of the wheel. Piston 48 is reciprocable in cylinder 42, and piston 49 in cylinder 43. Rod 50 extends downwardly from cylinder 42, and rod 51 downwardly from cylinder 43. Holes 52 and 53 are provided in upper frame or housing 2 in which pins (not shown) may be inserted to engage the ends of rods 50 and 51 respectively to prevent their descent and to hold them in retracted positions.

As viewed in Figs. 1 and 3 of the drawing, the machine is arranged for clockwise rotation of wheel 17 during performance of the twisting operation. An extension rod 54 is rigidly coupled to the end of piston rod 50 by means of right- and left-hand threaded sleeve S and pivotally connected at its lower end 55 to wheel 17. Accordingly, it will be seen that when fluid pressure is admitted to the lower end of cylinder 42, piston 48 will be retracted therein and wheel 17 will be turned in a clockwise direction through the force acting in tension on rod 54. Such force, is of course, transmitted downwardly upon the top of frame 2 through trunnion supports 46 and cylinder 42, and cylinder 42 will swing slightly on its trunnions to accommodate the change in position of pivotal connection 55 and the corresponding change in angle of rod 54.

As shown in Figs. 1 and 3 and on an enlarged scale in Fig. 5, a stop lug 56 may be fitted and secured in a recess in the side of wheel 17 in position to engage the projecting face 57 of a fixed stop secured in boss 58 of base frame 1. Such clockwise rotation of wheel 17 may accordingly be positively and precisely limited by mechanical means without the necessity of employing limit switches, brakes and the like. The fluid pressure in cylinder 42, of course, serves to draw stop lug 56 firmly against fixed stop 57 without rebound. Stop lug 56 may be relocated in a variety of positions on wheel 17 to provide for a corresponding variation in the angle through which wheel 17 is to be rotated. A similar fixed stop 59 is provided on frame 1 to engage stop lug 56 when the wheel is rotated in the opposite (counterclockwise) direction. To effect such rotation, rod 54 is first disconnected from the wheel at 55 and then from piston rod 50 of cylinder 42. A pin is inserted in aperture 52 in upper frame 2 to prevent extension of piston rod 50 and the pin is withdrawn from aperture 53 to permit rod 54 now to be joined to piston rod 51 of cylinder 43 with its end pivotally connected to wheel 17 at 60. Fluid pressure may now be admitted to the lower end of cylinder 43 to retract rod 54 and rotate wheel 17 in a counterclockwise direction to the extent permitted by stop 59 and appropriately positioned stop lug 56. The stops 57 and 59 will preferably be in pairs adapted to engage corresponding lugs on opposite sides of wheel 17 in order that the stresses imposed upon the latter may be uniform.

As shown diagrammatically in Fig. 9, a high-low pressure pump arrangement is employed driven by a common 25 horsepower electric motor 61. 70 G. P. M. variable volume, dual pressure pump 62 is operative to deliver hydraulic fluid from reservoir 63 to pressure line 64, and 3 G. P. M. variable volume pump 65 which may normally operate in a pressure range of 800 or 900 p. s. i. is adapted to deliver high pressure hydraulic fluid to line 67. Line 64 leads through solenoid operated valve 68 to line 69 which connects through flow control valve 70 to the head end of twisting cylinder 43. Line 71 connects the rod end of cylinder 43 with valve 68 through shut-off valve 72. Branch line 73 similarly leads through solenoid operated valve 74 to line 75 which connects through pressure regulating valve 76 to the upper end of twisting cylinder 42.

Valve 74 alternatively connects line 73 to line 77 leading through shut-off valve 78 to the rod end of cylinder 42.

Lines 64 and 67 are interconnected by check valve 79, and line 67 is adapted to be connected through solenoid operated valve 80 alternately to line 81 and line 82. Line 82 connects with the upper ends of both outer clamp cylinders 7 and 8, and line 81 connects with the rod ends of both such cylinders. A branch line 83 is connected through solenoid operated valve 84 alternately with lines 85 and 86. Line 86 leads to the outer ends of the center clamp cylinders 28 and 29, and line 85 leads to the rod ends of such cylinders. Pumps 65 and 62 are provided with solenoid controlled dual pressure governors 87 and 88.

Now referring more particularly to Figs. 6–9 inclusive, the operation of my new machine may readily be understood as follows. A forging F is placed on the stationary outer grip dies 5 and 6 shaped to receive the same, the upper clamping dies 13 and 14 being elevated and the central clamp or twisting dies being retracted through retraction of piston rods 32 and 33. When the forging has been properly positioned, the operator energizes solenoid 89 of valve 80 (push button control is employed throughout) to shift such valve and permit both low pressure and high pressure oil to flow through line 82 to the upper ends of outer clamp cylinders 7 and 8. Clamping dies 13 and 14 are accordingly brought down firmly to grip the end portions of the forging in cooperation with opposed fixed dies 5 and 6. The operator now actuates solenoid 90 of valve 84 to shift such valve to connect line 83 to line 86 and thereby admit both high and low pressure oil to the outer ends of center clamping cylinders 28 and 29. Center clamping dies 40 and 41 are thereby moved radially inwardly to grip the central portion of the forging intermediate the outer clamping dies, as shown in Fig. 4 for example. When the forging has been thus gripped by each of the dies, the high pressure oil from pump 65 serves to retain them in firmly clamping closed position.

The operator now actuates solenoid 91 of valve 68 for a right-hand twist or solenoid 92 of valve 74 for a left-hand twist, whichever may be required. The solenoid control of the dual pressure governor 88 for pump 62 is simultaneously energized to cause the pressure delivered by this pump to rise to the high pressure range (e. g. 600–700 p. s. i.). This oil flows through valve 68 to the rod side of cylinder 43, causing piston 49 to move to the "in" position and thereby rotating wheel 17 to twist the forging. The speed of the twisting operation is determined by the adjustment of the flow control valve 70 for a right-hand twist or by the flow control valve 76 for a left-hand twist.

When the twisting operation has been completed, solenoid 93 of valve 84 is energized to reverse the flow of oil to the center clamp cylinders 28 and 29, causing pistons 30 and 31 to be retracted and dies 40 and 41 withdrawn to disengage the work. When the center clamp has been thus released, solenoid 94 of valve 80 is energized to reverse the flow of oil through such valve and thereby shift pistons 9 and 10 of the outer clamp cylinders 7 and 8 to their upper positions, consequently raising the outer clamping dies 13 and 14.

With both the inside and outside clamps thus released, the operator next removes the twisted forging (Fig. 8) from the machine and then energizes solenoid 95 of valve 68, causing pump 62 to drop to low pressure and also reversing valve 68 to admit low pressure oil to the upper end of twisting cylinder 43 through the free flow orifice of the throttling valve 70. This causes piston 49, rod 51 and rod 54 to move downwardly and return wheel 17 to starting position, thus completing one cycle of the machine. I have found it possible to perform the complete cycle described above in a period of slightly more than eight seconds. Of course, if the wheel were rotated in the opposite direction to perform the twist, then solenoid 96 of valve 74 would be energized to admit fluid to the upper end of cylinder 42 and return the wheel to starting position in a similar manner.

Figure 7:
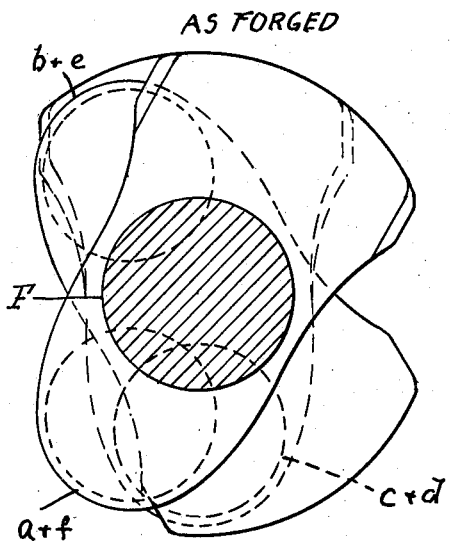
Fig. 7 is an enlarged transverse section taken on the line 7—7 of Fig. 6 indicating the position of the crankshaft throws as forged.
Figure 8:
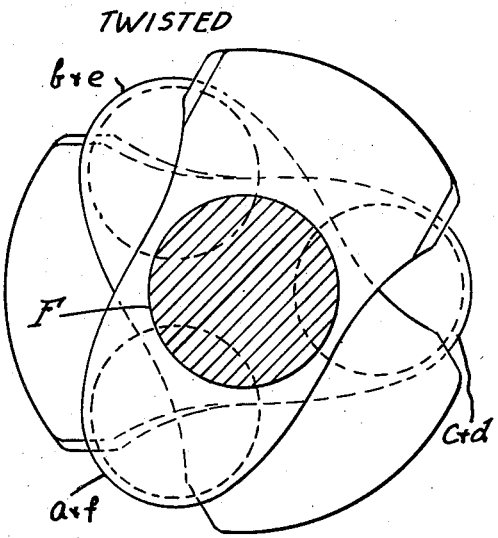
Fig. 8 is a section corresponding to Fig. 7 but illustrating the relative positions of the crankshaft throws subsequent to performance of the twisting operation.
Figure 6:
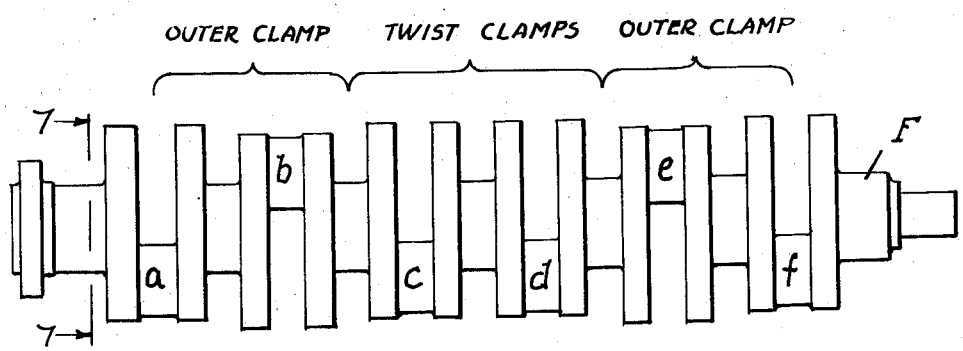
Fig. 6 is a side view of a typical crankshaft forging adapted to be twisted by the machine of my invention.

The forging F of Figs. 6-8 inclusive may be forged with certain of the throws slightly angularly offset as shown in Fig. 7 and the remaining degree of desired angular offset, as indicated in Fig. 8, obtained through employment of my new twisting operation. As will be seen from the foregoing, my machine is extremely rapid in operation but nevertheless positive and precise in its action inasmuch as the degree of rotation of wheel 17 is controlled by direct engagement of mechanical stops under force imposed through tension by a hydraulic piston-cylinder assembly. There is accordingly no problem of bending, buckling or distortion of rod 54 or of other parts which would limit the accuracy of the mechanism. Likewise, there is nothing corresponding to the conventional brake which tends to get out of adjustment with consequent variation in the result obtained. Pistons 48 and 49 may be provided with cushioning heads to cushion the ends of their strokes.

As best shown in Fig. 1, swivel pipe connections are provided for the center clamp cylinders 28 and 29 which are carried by wheel 17. Thus, line 86 leading to cylinder 28 comprises pipe sections 97 and 98 pivotally connected to each other and pivotally connected at their respective ends to cylinder 28 and frame 2. The portion of line 86 leading to cylinder 29 comprises similar pipe sections 99 and 100. The section of line 85 leading to the rod end of cylinder 28 comprises swivel jointed pipe sections 101 and 102, and the portion leading to the rod end of cylinder 29 comprises similar pipe sections 103 and 104. The connections of such swivel pipe sections may be detached from their positions on frame 2 as shown and attached to the opposite sides of such frame when wheel 17 is to be rotated in the opposite direction (counterclockwise) through actuation of cylinder 43. A certain amount of time may be saved in the operating cycle by the provision of a cam or dog 105 on wheel 17 adapted to engage limit switch 106 mounted on the upper frame 2 in proper position for actuation upon completion of the twisting operation. Actuation of switch 106 may be utilized to energize solenoids 93 and 94 of valves 84 and 80 automatically to open the center clamp and raise the outer clamping dies for removal of the work-piece by the operator. The operator may then manually energize solenoid 95 to reverse valve 68 to return wheel 17 to starting position.

The adjustable rollers supporting and centering the wheel are adapted to take up wear in use to maintain the dies properly centered. The twisting force places the bar 54 in tension but is transmitted downwardly upon the rigid frame of the machine well designed to support such force with a minimum of yielding or distortion. Of course, by employment of appropriate dies, items other than crankshafts may be twisted, but the latter constitute the most important articles requiring such treatment.

Other modes of applying the principle of the invention may be employed, change being made as regards the details described, provided the features stated in any of the following claims or the equivalent of such be employed.

I therefore particularly point out and distinctly claim as my invention:

1. In a machine for twisting a work-piece having a stationary supporting frame, clamping means on said frame for firmly clamping a portion of such work-piece against rotation, a rotatable frame mounted for rotation about the axis of such work-piece thus clamped, and clamping means on said rotatable frame for rigidly clamping a portion of such work-piece for rotation therewith; two fluid pressure piston-cylinder assemblies mounted on said stationary frame substantially laterally spaced apart, and means selectively pivotally connecting a said respective assembly to said rotatable frame on the same side of the axis thereof selectively to rotate said rotatable frame in opposite directions through tension in such connections.

2. In a crankshaft twisting machine comprising a frame, two laterally spaced fixed dies carried by said frame, movable dies complementary to said fixed dies, fluid pressure piston-cylinder means on said frame operative to move said movable dies toward and away from said respective fixed dies to grip the respective end portions of a crankshaft therebetween, a wheel intermediate said pairs of dies and co-axial with a work-piece gripped thereby, a pair of dies carried by said wheel radially reciprocable toward and away from each other to grip the portion of such crankshaft intermediate said first two pair of dies, and means mounting said wheel for rotation about its axis; fluid pressure piston-cylinder assemblies carried by said wheel operative to reciprocate said dies carried by said wheel into and out of crankshaft gripping position, a fluid pressure piston-cylinder assembly pivotally mounted on said frame and pivotally connected to said wheel operative to turn the latter through tension on such connection to twist such crankshaft, swing joint pipe sections connected to said fluid pressure piston-cylinder assemblies on said wheel, and pivotal connections on said frame for said pipe sections on each side of said latter piston-cylinder assemblies in starting position of said wheel for selective attachment of said sections depending on the selected direction of work-twisting rotation of said wheel.

3. In a crankshaft twisting machine comprising a frame, two laterally spaced fixed dies carried by said frame, movable dies complementary to said fixed dies, power means operative to move said movable dies toward and away from said respective fixed dies to grip the respective end portions of a crankshaft therebetween, a wheel intermediate said pairs of dies and co-axial with a work-piece gripped thereby, and a pair of dies carried by said wheel radially reciprocable toward and away from each other to grip a portion of such crankshaft intermediate said first two pair of dies; a plurality of rollers mounted in said frame on horizontal axes parallel to that of said wheel and engaging the outer periphery of said wheel to center and support the same for rotation about the axis of such crankshaft, said rollers also engaging said wheel laterally to hold the same against axial shifting, hydraulic piston-cylinder assemblies carried by said wheel operative to reciprocate said dies carried by said wheel into and out of crankshaft gripping position, opposed stops on said wheel and frame adapted to limit rotation of said wheel to a predetermined amount, an hydraulic piston-cylinder assembly horizontally pivotally mounted on the upper portion of said frame above said wheel, the pivotal axis of said latter assembly being parallel to but laterally of the axis of said wheel, a rod depending from said latter assembly and reciprocable thereby, and means pivotally connecting the lower end of said rod to the lower portion of said wheel on the same side of the axis of said wheel as the pivotal axis of said latter assembly for pivotal movement about a parallel axis, whereby said wheel may be rotated by upward reciprocation of said rod under tension to twist such crankshaft with the twisting force being transmitted downwardly upon said frame by said latter piston-cylinder assembly.

References Cited in the file of this patent

UNITED STATES PATENTS

| | | |
|---|---|---|
| 1,778,879 | Wolfe et al. | Oct. 21, 1930 |
| 1,909,097 | Damerell | May 16, 1933 |
| 1,991,567 | Morgan | Feb. 19, 1935 |
| 2,018,931 | Swanson et al. | Oct. 29, 1935 |
| 2,229,517 | Nighthart | Jan. 21, 1941 |
| 2,414,549 | Nowak | Jan. 21, 1947 |
| 2,691,553 | Pettigrew | Oct. 12, 1954 |